(12) United States Patent
Raghunath et al.

(10) Patent No.: US 7,389,530 B2
(45) Date of Patent: Jun. 17, 2008

(54) PORTABLE ELECTRONIC DOOR OPENER DEVICE AND METHOD FOR SECURE DOOR OPENING

(75) Inventors: Mandayam Thondanur Raghunath, Fishkill, NY (US); Chandrasekhar Naravanaswami, Wilson, CT (US)

(73) Assignee: International Business Machines Corporation, Armonk, NY (US)

( * ) Notice: Subject to any disclaimer, the term of this patent is extended or adjusted under 35 U.S.C. 154(b) by 746 days.

(21) Appl. No.: 10/661,852

(22) Filed: Sep. 12, 2003

(65) Prior Publication Data

US 2005/0060555 A1 Mar. 17, 2005

(51) Int. Cl.
*G06F 7/04* (2006.01)
(52) U.S. Cl. .......................... 726/2; 713/155; 713/156
(58) Field of Classification Search ................ 713/156, 713/185, 186, 155; 726/20, 9, 10, 2
See application file for complete search history.

(56) References Cited

U.S. PATENT DOCUMENTS

| 5,442,342 | A   | * | 8/1995  | Kung ........................ 340/5.27 |
| 5,767,784 | A   |   | 6/1998  | Khamharn ................ 340/5.23 |
| 6,084,969 | A   |   | 7/2000  | Wright ....................... 380/271 |
| 6,304,658 | B1  | * | 10/2001 | Kocher et al. ................ 380/30 |
| 6,430,690 | B1  |   | 8/2002  | Vanstone .................... 713/182 |
| 6,718,467 | B1  |   | 4/2004  | Trostle ........................ 713/171 |
| 7,039,812 | B2  | * | 5/2006  | Kawan et al. .............. 713/186 |
| 7,083,090 | B2  | * | 8/2006  | Zuili .......................... 235/383 |
| 2006/0072755 | A1 | * | 4/2006 | Oskari ........................ 380/270 |

OTHER PUBLICATIONS

M. D. Corner et al, "Zero-Interaction Authentication" chiefly sections 2.2, 2.4, 2.6; in "Proc. of the 8th Ann. Intrntl. Conf. on Mobile Computing and Networking" pp. 1-11, ACM Press New York, NY, USA (2002) ISBN:1-58113-486-X.

* cited by examiner

*Primary Examiner*—Ellen Tran
(74) *Attorney, Agent, or Firm*—George Sai-Halasz

(57) ABSTRACT

A portable computing device for opening a door (an electronic door opener) and a method for its use is disclosed. The computing device has a shared secret key, a standard certificate, means for communicating with the door, and a processor adapted for performing operations with shared secret keys and standard certificates. The door also possesses the same shared secret key. Under normal operation, messages encoded with the shared secret key serve to establish a right to open the door. The portable computing device's standard certificate is used to respond to occasional challenges by the door, and to generate the shared secret key. Biometric capabilities of the portable computing device add an additional layer of security in screening the identity of the user of the device. A security system for controlling access, involving a first plurality of computing devices and a second plurality of doors, and operating based on shared secret keys and occasional challenges is also disclosed.

14 Claims, 3 Drawing Sheets

PORTABLE ELECTRONIC DOOR OPENER DEVICE AND METHOD FOR SECURE DOOR OPENING

FIELD OF THE INVENTION

The present invention relates to controlling secure passage through doors with the use of electronic encryption techniques.

BACKGROUND OF THE INVENTION

Permitting access through a door to the right person while keeping unwanted ones out is a common problem. There is always a tradeoff between security, that is to make sure that no one unauthorized enters, and the burden that is imposed in difficulty and time on the right persons to prove their identity for entering. Such problems are in the general domain of doors and keys.

SUMMARY OF THE INVENTION

Currently people carry several keys, typically one key per door, they have access to. In addition, if more than one person has access to a particular door, each person has an identical copy of the same key. One other issue with the current door and key mechanism is that one of the key holders may duplicate the key and give it to a third party. In this case, an unauthorized party may obtain access to a door merely by colluding with one authorized person. Further, when such a copy has been made, a person may have access to the door even when their authorization is revoked, i.e., their key is taken back.

In view of such needs the present invention discloses a device and method whereby physical keys are replaced with electronic keys which are stored in an electronic door opener device, which can be called a portable computing device, such as a badge or a wristwatch.

The present invention is to create a separate electronic key (sequence of bits) for each device-door pair and store these keys on the mobile device carried by the user. The door also holds a set of these shared secret keys, one per each authorized user/device. As part of the access verification process the user has to prove that he/she has the key in question. This can usually be done without revealing the key. In an exemplary embodiment the door will send a random number encrypted using the shared secret key, and the user's device will have to decrypt the message to find the random number, increment the number and send it back.

Using standard techniques based on public/private key encryption routinely can afford better security than shared secret based schemes, but operations involving private keys tend to be slow, especially when run on a device with limited computing capabilities, resulting in potentially unacceptable delays in the opening of doors. Schemes that use a shared secret key approach are much less computationally intensive. Such shared secret based authentication schemes can be executed rapidly on devices with limited computation capabilities enabling the user to quickly authenticate and open the door. The problem with shared secret based schemes is that if the same key is used for too long an attacker may discover the shared secret. In other words shared secrets become stale with use.

So the normal way of combining faster shared secret based schemes with more secure private-public key mechanisms is to use private-public mechanisms to establish a shared secret key which is then used for future communication. The shared secret key itself is periodically changed using an agreed upon protocol.

In addition, certificates issued by trusted third parties bind a user's identity to particular public key. When a user presents the certificate and also proves that he or she possesses the private key corresponding to the certified public key, the user proves his or her identity to the door, so long as the door trusts the third party who issued the certificate.

This invention discloses a scheme for users to prove their identity to doors quickly, mostly using shared secret schemes, instead of the slow public-private key mechanisms so that the delays in the opening of the doors is minimized. In addition this scheme limits the amount of data that has to be exchanged between the door and the computing device (door opener device).

Assuming that the electronic door opener (computing device) has a set of shared secret keys corresponding to different doors, and similarly the door has a set of secret keys corresponding to different users, the computing device and the door must be able to identify each other to figure out which shared secret key to use for their communications. One can accomplish this by the help of a standard certificate, which has the identifying information of the party concerned. To speed up communication, each party may retain copies of the certificates. In this case it is sufficient to exchange smaller hashes of the certificates. The hash code is used to find the certificate which then identifies the communicating party, and then locate the key in question. Optionally, each party may at random choose to challenge the other to prove that they indeed hold the private key corresponding to the public key that is part of their certificate in order to protect against attacks that seek to find out the shared secret. When a challenge is issued, the process of opening the door takes additional time since the computing device will have to perform public-private key computations. However, since the problem of one door sharing its shared secret keys with another door is not a significant danger, one can relax the requirement of certificates for doors. Doors can have simple identifiers that are sent to the electronic computing device in the clear. Computing devices (door openers) can also have separate identifiers that are sent in the clear. However, since they have to have certificates anyway, hash codes of the certificates naturally give individual identifiers without the overhead of administration.

The advantage of the shared secret key communication is that private key operations need only be done at setup time, or during the random challenge. From an usability perspective, in the frequent cases it is acceptable for the door entry authorization to take up to a few seconds at most, which is generally insufficient to perform asymmetric key based operations, especially on low cost processors, such as the computing device might be capable of having.

In some exemplary embodiments a further layer of security can be achieved by adding a biometric device, such as a fingerprint reader, to the computing device. In such a case the private key corresponding of the certificate is stored encrypted on the computing device, where a biometric is the encryption key. In order to perform a private key operation the mobile device needs the user to scan his/her biometric in, thereby being able to create the biometric key needed for decryption of the private key.

Accordingly, it is the object of the present invention to teach a computing device (an electronic door opener) set up for secure shared secret key based identification, backed up by a standard certificate.

It is a further objet of the present invention to teach the method to gain secure access to doors using secure shared secret key operations.

It is also a further object of the present invention to teach a security system for controlling access involving a plurality of doors and a plurality of computing devices.

It is yet another object of the present invention to teach the identification of not only a computing device, but that of the user through the use of biometry.

The present invention also teaches a computer program of instructions for executing a computer process performing the steps of secure unlocking of a door based on a shared secret key, as encoded in a carrier wave, such as an electromagnetic wave.

BRIEF DESCRIPTION OF THE DRAWINGS

These and other features of the present invention will become apparent from the accompanying detailed description and drawings, wherein.

DETAILED DESCRIPTION OF THE INVENTION

Figure 1:
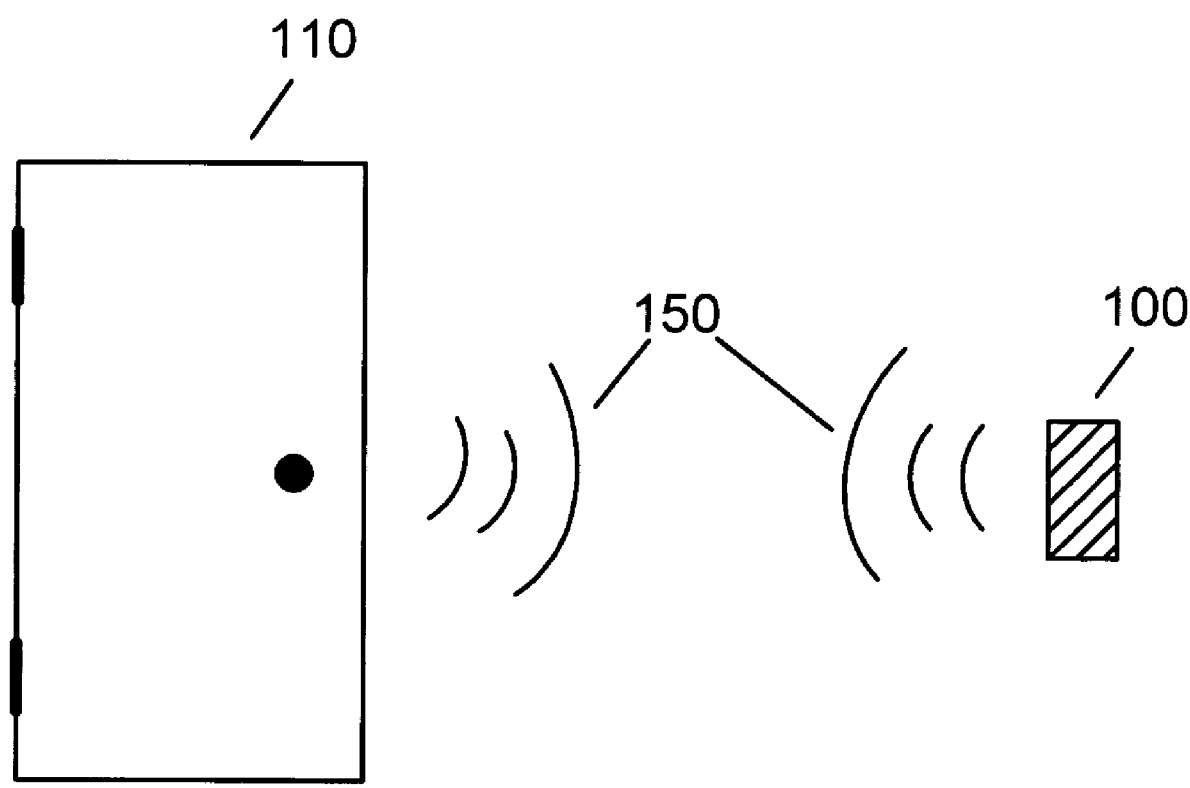
FIG. 1 shows the schematic of an exemplary embodiment of the secure electronic door opener (computing device), the door, and their operation.

FIG. 1 shows the schematic of an exemplary embodiment of the secure computing device, the door, and their operation. The computing device 100 communicates with a door 110. The computing device (the electronic door opener) has sufficient computing power to enable it to execute cryptographic operations, such as dealing with standard certificates and shared secret keys, but it should remain sufficiently simple in order to keep its price under control. The computing device 100 also has a memory with sufficient capacity to store as many door identifiers as needed, as well as at least one standard certificate. The means of communication are in a form of a carrier wave 150. For one ordinarily skilled in the art many means of such communication is familiar. The carrier wave in representative embodiments is electromagnetic in its origin; it can be of a wide variety of wavelengths, from radio to ultraviolet and beyond. Alternatively the carrier wave might be of material characteristics, such as, for instance, a sound wave. The specifics of the carrier wave are not important from this invention's point of view. It is important that the carrier wave embodies a computer data signal which encodes the computer program of instructions executing the computer process performing the steps for secure unlocking of the door 110 based on a shared secret key scheme between the computing device (the electronic door opener) 100 and the door 110.

Figure 2:
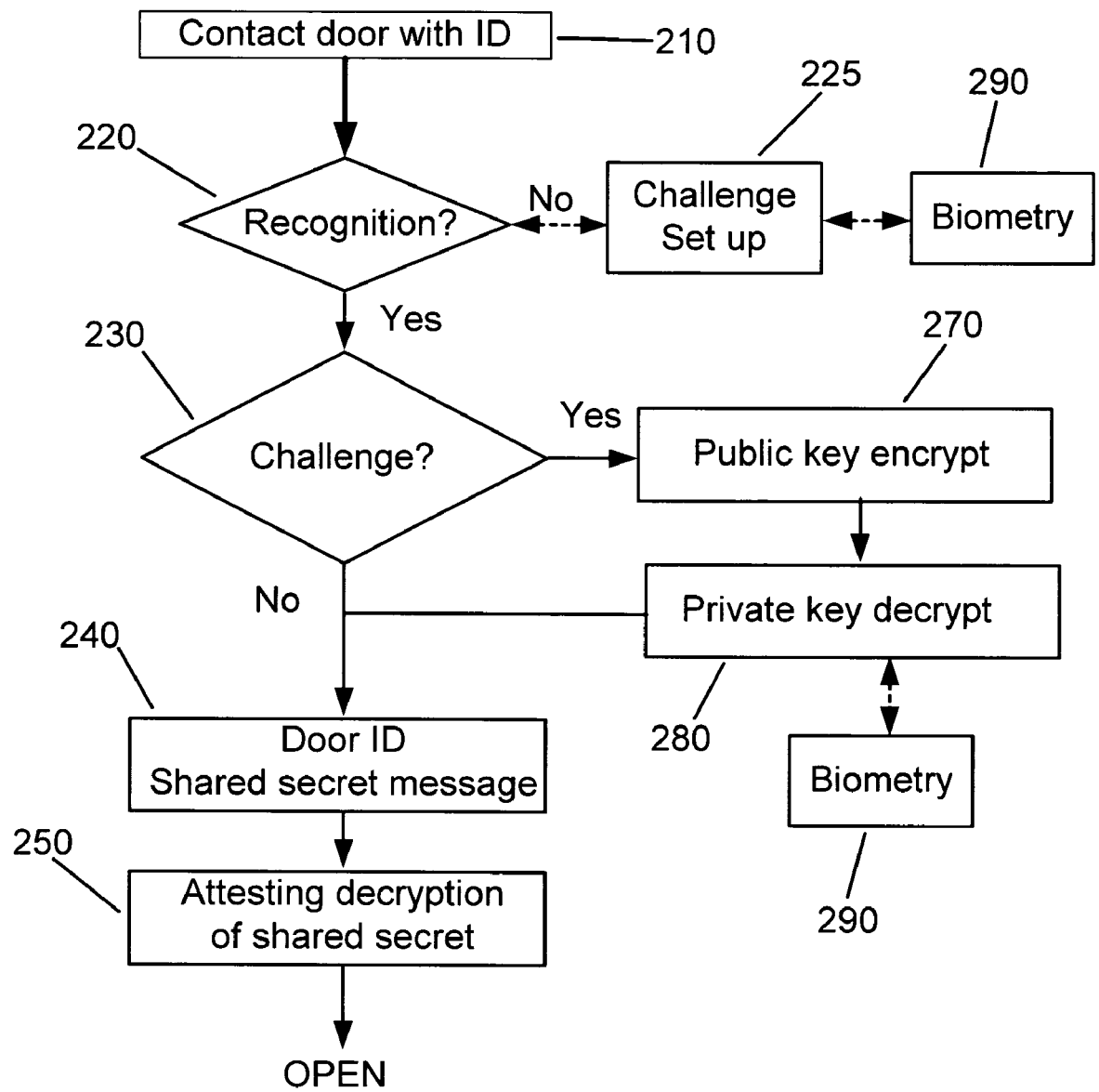
FIG. 2 shows a diagram outlining the secure door opening method.

FIG. 2 shows a diagram outlining the secure door opening method. The method typically starts with the user who is using the computing device 100, to approach the door 110. The computing device is equipped with a processor which is adapted for performing operations with shared secret keys and standard certificates. In the normal course of operation the computing device has in its possession a first copy of a shared secret key, and a first standard certificate. The computing device sends 210 a device identifier, a type of ID which identifies the specific computing device to the door. In the normal operation the communicated ID can be a hash of the first standard certificate in the computing device's possession. A hash code is typically a byte string of fixed length that is independent of the length of the message that is computed using a mutually agreed upon hashing algorithm. The hash has the property that even if one bit changes in the message the hash changes. Also given a hash value, it must be difficult to create a message that will hash to that specific value. Hashing algorithms, such as MD5, SHA-1, and others are known in the cryptographic arts. By sending a hash of the certificate, instead of the certificate itself, the computing device saves in needed communication, and thus it saves time. The door receives the communication from the computing device 220 and checks if it can recognize the hash. If the hash code of the computing device is recognized, the door makes a decision whether to issue a challenge to the computing device 230. In the normal course if activities, the door does not issue a challenge and proceeds by communicating to the computing device a door identifier and a message 240. In a representative embodiment the door possesses a second standard certificate, and the door identifier is a hash code of the second standard certificate. Alternatively, since the problem of one door sharing its keys with another door is not a significant danger since doors are in position to grant access if they so "desire" anyway, one can relax the requirement of certificates for doors. Doors can have simple identifiers that are sent without encryption, in the clear, in order to help the computing device identify the door and the shared secret key corresponding to the door.

Once the door has identified the door opener device, it identifies the appropriate secret key they share. At this point the door also sends a message which is encrypted with a second copy of a shared secret key, with the first copy being supposedly in the possession of the computing device. The door has chosen this particular shared secret key because this shared secret key was associated with the device identifier that it has just received. Accordingly, the use of the second copy of the shared secret key for encrypting the message resulted from recognizing the device identifier transmitted by the computing device. The message itself can be practically anything. In a typical embodiment the message the door can send is a random number encrypted using the door's copy, a second copy, of the shared secret key. The computing device will be receiving the door ID and the message and will have to attest that it can decipher the message 250. The computing device must recognize the door's identifier. This recognition will tell the computing device which of the plurality of shared secret keys to use to decrypt the message of this particular door. The computing device will use its first copy of that shared secret key for decrypting the message which resulted from recognizing the door identifier that was just transmitted. Typically the computing device holds a plurality of shared secret keys, with each shared secret keys pertaining uniquely to a different door, since it is useful if the portable computing device is capable of opening a plurality of doors. Once the door's message has been decrypted with the first copy of the right shared secret key the attesting of the decryption can be a trivial matter. For instance, in a typical embodiment when the door sends a random number, the computing device can attest by incrementing the number by one and retransmitting it to the door. One skilled in the art, however would recognize many other alterative schemes for exchanging messages with shared keys. Having thus answered to the door's satisfaction, the door will open.

On randomly selected occasions, not too often because of user inconvenience associate with the longer time it takes, the door will issue a challenge to the computing device 270, after having received the computing device's identifier. To be sure that the door is dealing with the right computing device and not a cheat, which has only gotten hold of the device's identifier and somehow discovered the shared secret, the door demands a demonstration that the computing device indeed possesses the private key belonging to the standard certificate which the computing device is supposed to have. The challenge is proceeding in manners known in the art. The door sends a message encrypted with the public key of the device's standard certificate, and the computing device has to decode it with its private key 280, thereby demonstrating possession of a private key part of the first standard certificate. Again, in a typical embodiment the challenge message can be a random number, and the answer an increment of the number. Upon the proper answer the method reverts to the usual track 240 of exchanging messages with shared secret keys. Additionally at this point, the door and the door opener (the computing device) may generate a new shared secret key. If any of these exchanges are unsuccessful, of course, the door refuses to open.

In an exemplary embodiment of the invention one can additionally make sure that when a challenge is issued not only the right computing device is the one trying to open the door, but that the user who is using the computing device is the rightful owner of the computing device. In general every individual can have a unique biometric identifier, which when expressed in a digital form can be turned into a digital biometric key. This biometric key typically would be a digital sequence of numbers unique to a certain individual. For instance, the biometric key might be based on the fingerprint of the individual. In this embodiment the private key corresponding of the first standard certificate on the computing device is stored encrypted, where the encryption key is a first biometric key belonging to the rightful owner of the computing device. The computing device is further equipped with a biometric device, such as a fingerprint reader. Upon receiving a challenge from the door to prove the existence of the private key belonging to the first standard certificate, the computing device can only successfully answer if the biometrically encrypted private key is decrypted. The computing device is capable of generating a second biometric key with its biometric device by taking a reading of the user who is using the computing device. The computing device will attempt to decrypt the encrypted private key part of the first standard certificate using this now generated second biometric key. If the first and second biometric keys are identical, the decryption using the second biometric key will be successful, and the challenge can be responded. The first and the second biometric keys will only be identical if the user is the rightful owner of the computing device. This adds an additional layer of security as shown in FIG. 2 with box 290. The arrows leading to and from box 290 are dashed, indicating the optional nature of the biometric steps.

If, after the initial contact by the computing device 210, the door does not recognize the device identifier 220, it interprets it that this particular computing device at this moment is not authorized to open the door. It is possible, however, that the device belongs to a user which is authorized to open the door, but has not as yet set up the proper framework for identification. In an exemplary embodiment, for such a case the initial set up of the device and user can proceed along similar lines as the challenge 225.

The shared secret keys between the doors and the users themselves can be established using a scheme similar to the random challenge. At any given time, the door may contain a list of allowed users. Subsequently when the user approaches the door for the first time, the user's portable device will present a device identifier, typically a hash of its certificate. The door will not have a secret key, nor a certificate corresponding to the presented device identifier. So the door will challenge the user's device for a full public-private key operation. The user's mobile device will then present its certificate. The door will verify that the certificate is signed by a third party it trusts. Then it will verify that the identity in the certificate corresponds to a person who is on the list of allowed users. Next it will ask the user's device to prove that it holds the private key corresponding to the public key that is part of the certificate. Once the user's device is able to offer this proof, the door and the device establish a shared secret key 225. Typically the door may generate a random key that it will send to the user's device encrypted using the user's public key. If the user's device is able to decrypt the message and send something to the door using the random key that the door has just created, the user's device has both proved to the door that it has the corresponding private key and it also now has the shared secret key that is to be used in the future. Subsequent authorizations use the shared secret key. The door will save the secret key it exchanged with the device, the user's certificate and the device identifier, so that the key can be found when the user's device presents the hash of its certificate the next time around. Just as for the random challenge 230, one can further augment security by ascertaining that the user is the rightful owner with the use of biometry 290. Of course if the door does not find the identity in the certificate on the its list of allowed users, the door refuses to proceed.

In an alternate embodiment a supervisor may do the initial set up of all the computing devices and doors, in which case the door would not have a list of allowed users that have not set up their devices as yet. In this embodiment if the door does not recognize the device identifier, it will always refuse entry without further activity.

The shared secret key of which a first copy is with the computing device and second copy with the door, can be replaced on occasion, for instance after a successfully answered challenge. During such replacements, similarly to when the first shared secret key was originally generated, it can be done in the following manner. The shared secret key is a random sequence of bits that the door generates. The door and the computing device set up a secure connection using the public key that is part of the computing device's standard certificate and the door sends a first copy of this shared secret key to the user's device over the secure channel that has been set up in this manner. Thus, the shared secret key is generated by the door and exchanged with the electronic door opener (the computing device) using a public key part of the first standard certificate.

Figure 3:
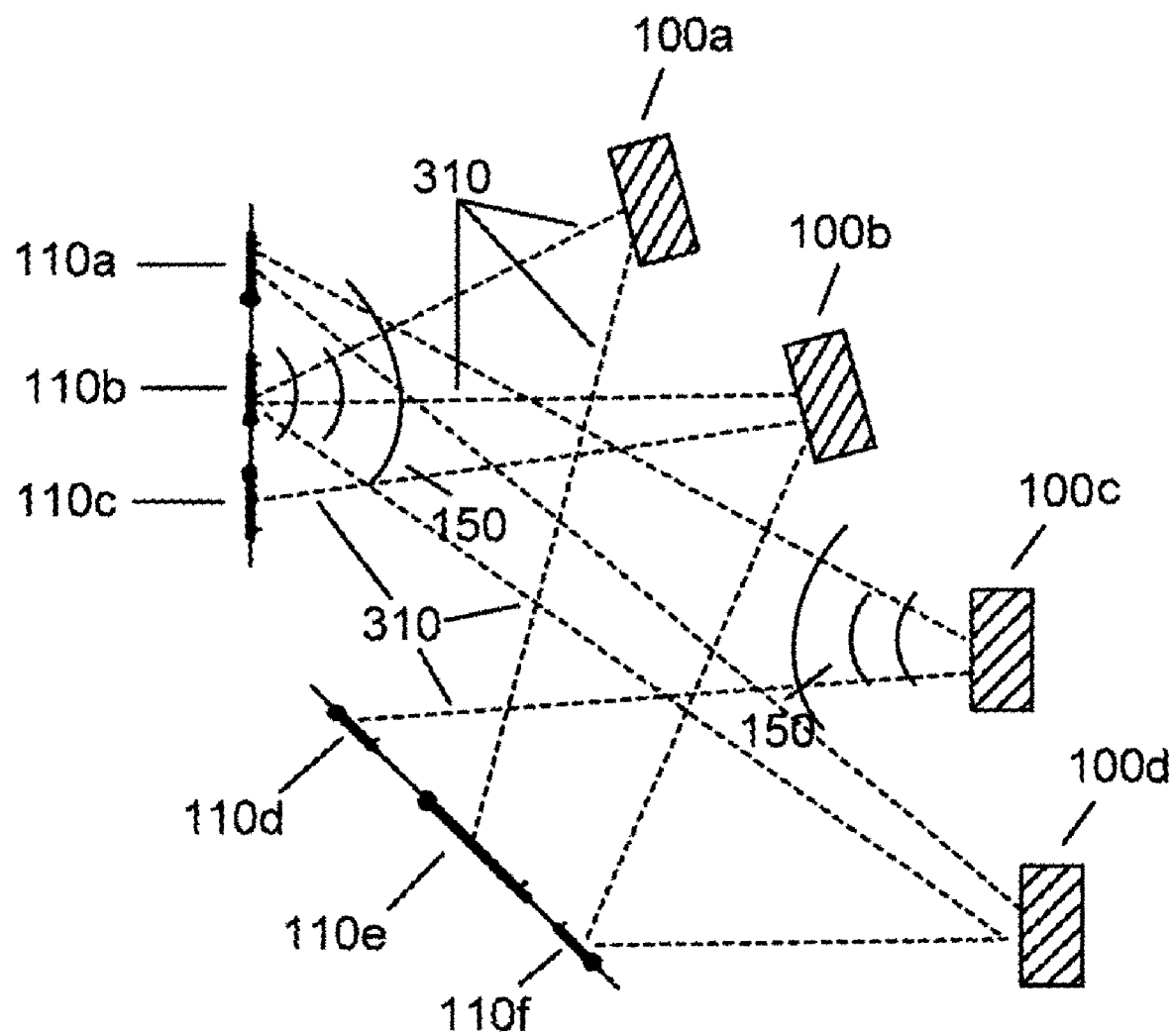
FIG. 3 shows a symbolic representation of a security system for controlling access.

FIG. 3 shows a symbolic representation of a security system for controlling access. The security system involves a first plurality of doors 110*a*. . . 110*f* and a second plurality of portable computing devices for opening doors 100*a*. . . 100*d*. The doors and the computing devices have means for communicating with each other, allowing sending of signals between any device and any door, as is illustrated by carrier waves 150 showing door 110*b* and computing device 100*c* in a signaling state. The dotted lines 310 indicate the relations between the doors and the computing devices, by connecting computing devices with those door that they are allowed to open. In FIG. 3, for illustration and example, device 100*b* is authorized to open doors 110*b*, 110*c*, and 110*f*; while, for instance, device 110*d* can open doors 110*a*, 110*b*, and 110*f*. Looking from the door's side, FIG. 3 illustrates that, for instance, door 110c is opened only by device 100b, while door 110b by devices 100a, 100b and 100d, and door 110f by devices 100b and 100d. In exemplary embodiments of the invention the plurality of doors and devices can be large, for instance in the thousands, or even over.

As it was already discussed, each computing device is equipped with a memory. Any one of the computing devices holds in its memory a unique first standard certificate, which belongs only to itself. The memory of the device may also hold the hash of the standard certificate as device identifier, or alternatively, the computing device may compute the hash from the certificate "on the fly" when it contacts a door. This any one of the computing devices further holds in its memory the door identifiers for all those doors, out of the first plurality of doors, that it is permitted to open, and these identifiers are uniquely linked to the first copies of those shared secret keys that belong to the door identifiers. To illustrate, for instance, computing device 100c hold in its memory a unique standard certificate that belongs only to itself, it also hold identifiers for door 110a, and door 110d. It also holds first copies of two shared secret keys, those ones of which doors 110a and 110d hold a second copy of. The door identifiers link to the appropriate shared secret keys. For instance, the identifier of door 110a links in the memory of device 100c to the shared secret key which is common to device 100c and door 110a. Accordingly when door 110a sends its own identifier and a message encrypted with a shared secret key to device 100c, the device 100c upon receiving the message will "know" to decrypt it with that shared secret key which in its memory is associated (linked) with the identifier of door 110a.

Each, and any one, door possesses matching information for each one of those computing devices out of the second plurality of computing devices, that are permitted to open this any one door. The matching information includes a device identifier, typically a hash code of the device's unique standard certificate, a public key part of the device's unique first standard certificate, and a second copy of the shared secret key. The device identifier is linked to the appropriate public key and shared secret key. For instance in FIG. 3 door 110f possesses identifiers of devices 100b and 100d. The identifier of device 100b is linked to the public key part of the standard certificate of device 100b and to the second copy of that shared secret key, which is shared between door 110f and computing device 100b. In the same manner, door 110a hold identifiers of devices 100c and 100d. The identifier of device 100d is linked to the public key part of the standard certificate of device 100d and to the second copy of that shared secret key, which is shared between door 110a and computing device 100d. While identifier of device 100c is linked to the public key part of the standard certificate of device 100c and to the second copy of that shared secret key, which is shared between door 110a and computing device 100c.

Many modifications and variations of the present invention are possible in light of the above teachings, and could be apparent for those skilled in the art. The scope of the invention is defined by the appended claims.

We claim:

1. A method for secure unlocking of a door based on a shared secret key, comprising the steps of:
    providing a portable computing device, wherein the computing device is equipped with a memory, and the memory holds shared secret keys with matching door identifiers and a first certificate, wherein the computing device is adapted for performing operations with shared secret keys and certificates, and wherein the computing device is adapted for communicating with the door;
    the computing device communicating to the door a device identifier;
    the door makes a decision to issue a challenge to the computing device, wherein the challenge is issued only on randomly selected occasions;
    the computing device responding to the challenge by demonstrating possession of a private key of the first certificate;
    after a successful response to a challenge and after receipt of computing device identifier when a challenge decision is not made the door responding with a door identifier and with an encrypted message, wherein the message is encrypted with the shared secret key, and wherein using the shared secret key for encrypting the message resulted from recognizing the device identifier communicated by the computing device;
    the computing device responding with a signal attesting decryption of the message, wherein the message has been decrypted in the computing device by the shared secret key, and wherein using the shared secret key for decrypting the message resulted from recognizing the door identifier transmitted by the door; and
    the door unlocking upon recognizing validity of the signal attesting decryption of the message.

2. The method of claim 1, wherein the device identifier is a hash code of the first certificate.

3. The method of claim 1, wherein the door identifier is a simple identifier and it is sent without encryption.

4. The method of claim 1, wherein the door has a second certificate, and the door identifier is a hash code of the second certificate.

5. The method of claim 1, wherein the shared secret key is generated by the door and communicated with the computing device in private using a public key of the first certificate.

6. The method of claim 1, wherein the private key of the first certificate is encrypted with a first biometric key, wherein the first biometric key belongs to a rightful owner of the computing device, and wherein the computing device is provided with a biometric device, and wherein the step of responding to the challenge further comprise the steps of: taking a biometric reading of a user of the computing device; generating a second biometric key using the biometric reading; and decrypting the encrypted private key of the first certificate using the second biometric key, whereby if the first and second biometric keys are identical the decrypting using the second biometric key is successful, and the challenge can be successfully responded.

7. A security system for controlling access, comprising:
    a plurality of doors and a plurality of portable computing devices for opening the plurality of doors;
    wherein each computing device is equipped with a memory that holds a unique first certificate, door identifiers for all the doors out of the plurality of doors that the computing device is permitted to open, and shared secret keys that match each door identifier of the plurality of doors that the computing device is permitted to open;
    wherein any one of the doors possesses a matching shared secret key for each computing device that is permitted to open the door,
    wherein the matching information comprises a device identifier, wherein the device identifier is linked to a public key of the unique first certificate and the shared secret key, and wherein the plurality of doors and the plurality of computing devices have means for communicating between any device and any door and;

wherein the any one of the plurality of doors is adapted to recognize the device identifier, and further adapted to use the matching information to validate identicalness of the shared secret key, and to issue a challenge on randomly selected occasions to any computing device, using the public key of the unique first certificate.

8. The security system of claim 7, wherein the device identifier is a hash code of the unique first certificate.

9. The security system of claim 7, wherein the door identifier is a simple identifier and it is communicated without encryption.

10. The security system of claim 7, wherein the any one door further possesses a unique second certificate.

11. The security system of claim 10, wherein the door identifier is a hash code of the unique second certificate.

12. The security system of claim 7, wherein the unique first certificate is having a private key and the private key is being encrypted with a first biometric key, wherein the first biometric key belongs to a rightful owner of the computing device, wherein the any one computing device is further comprising a biometric device, wherein the any one computing device is further comprising a biometric device, wherein the biometric device is capable of generating a second biometric key, wherein the second biometric key belongs to a user of the any one computing device, and wherein the second biometric key is used to decrypt the private key of the unique first certificate.

13. The security system of claim 7, wherein the challenge by the any one door is successfully responded by demonstrating possession of a private key of the unique first certificate.

14. The security system of claim 7, wherein the any one door is further adapted to generate a shared secret key and communicate the shared key in private by using the public key of the unique first certificate.

* * * * *

UNITED STATES PATENT AND TRADEMARK OFFICE
CERTIFICATE OF CORRECTION

PATENT NO.        : 7,389,530 B2                                                      Page 1 of 1
APPLICATION NO. : 10/661852
DATED             : June 17, 2008
INVENTOR(S)       : Mandayam Thondanur Raghunath and Chandrasekhar Narayanaswami It is certified that error appears in the above-identified patent and that said Letters Patent is hereby corrected as shown below:

On the title page:

Item (75), the name of the second inventor should be:

Chandrasekhar Narayanaswami

Item (75), the residence of the second inventor should be:

Wilton, CT (US)

Signed and Sealed this

Twenty-first Day of April, 2009

JOHN DOLL
*Acting Director of the United States Patent and Trademark Office*